United States Patent [19]

Wehr

[11] Patent Number: 4,985,954
[45] Date of Patent: Jan. 22, 1991

[54] GLASS SAW

[76] Inventor: Thomas L. Wehr, R.R. #3, Box 232, Fairland, Ind. 46126

[21] Appl. No.: 430,427

[22] Filed: Nov. 2, 1989

[51] Int. Cl.$^5$ ............................. B25F 3/00; B26B 3/00; B26F 1/00
[52] U.S. Cl. ......................................... 7/144; 30/144; 30/318; 30/358
[58] Field of Search ................. 30/144, 145, 318, 358; 76/103, 119; 7/143, 144, 147, 148

[56] References Cited

U.S. PATENT DOCUMENTS

| 378,341 | 2/1888 | Snee | 30/358 |
| 961,218 | 6/1910 | Dunn | 30/318 |
| 1,423,140 | 7/1922 | Olesberg | 30/318 |
| 1,920,169 | 8/1933 | Briggs | 30/318 |
| 2,028,659 | 1/1936 | Green, Sr. | 30/318 |
| 4,461,080 | 7/1984 | Olson | 30/144 |

FOREIGN PATENT DOCUMENTS 1032591 6/1958 Fed. Rep. of Germany ........ 30/144

Primary Examiner—Douglas D. Watts
Assistant Examiner—Paul M. Heyrana, Sr.
Attorney, Agent, or Firm—Barnes & Thornburg

[57] ABSTRACT

A glass saw includes an elongated body portion having a forward end and a rearward end. A rear handle is provided at the rearward end. The rear handle extends generally transversely in first and second directions from the body portion. A forward handle extends generally transversely from the body portion intermediate the forward and rearward ends thereof. The saw blade has an end removably attached by a chuck to the forward end of the body portion.

13 Claims, 1 Drawing Sheet

GLASS SAW

This invention relates to emergency rescue equipment. Particularly, it relates to a glass saw for cutting the glass of motor vehicle windshields to facilitate their removal so that occupants of the vehicles can be treated and/or removed from them.

Motor vehicle windshields generally are made from glass and plastic laminates. The plastic laminates prevent the glass laminates, which may shatter in an accident, from flying apart and possibly injuring, or further injuring, the vehicle occupants. The side and rear windows of the vehicle are usually made of tempered glass which shatters into small flakes.

In a motor vehicle accident, the driver and/or passengers is/are sometimes trapped inside the vehicle. Frequently, this requires removal of the vehicle top to evacuate and treat the injured driver and/or passengers. Before the vehicle top can be removed, the windshield and the side and rear windows frequently have to be removed. Of course, during the process of window and top removal, occupants are covered, typically with protective blankets. Access to a trapped victim in a vehicle must be made with the least amount of movement of the vehicle possible to reduce the chance of further injury, particularly neck and spine injury, to the victim.

Tools frequently used by emergency medical personnel under such circumstances include axes, hay hooks and pneumatic hammers. These tools are sometimes used to cut or break through glass and plastic laminated windshields in an effort to remove them in one piece. The axe is a rather crude tool for this purpose. Care must be taken to prevent the axe head from entering the vehicle passenger compartment to reduce the risk of greater injury to the driver and front seat passenger. The force required to be exerted on the hay hook to remove the windshield tends to move the vehicle. As previously stated, moving the vehicle is risky and is to be avoided to reduce the risk of further neck/spine injury to the vehicle occupants. Air hammers can cause small glass fragments to fly around uncontrollably, placing not only the occupants, but also their rescuers at risk of further injury.

It is an object of this invention to provide a tool that will permit removal of glass and plastic laminated windshields faster and more safely for vehicle occupants and their rescuers. This tool also provides apparatus for removing tempered glass side and rear vehicle windows. Illustratively, this apparatus is removable from the tool so that the tool can be used by one rescuer to cut the windshield from the vehicle at the same time that the tempered glass removing apparatus is being used by another rescuer to take out the tempered glass in the vehicle's side and rear windows.

According to the invention, a glass saw comprises an elongated body portion having a forward end and a rearward end, a rear handle attached to the rearward end and extending generally transversely in at least a first direction from the body portion, a forward handle extending generally transversely from the body portion intermediate the forward and rearward ends thereof, and a blade removably attached to the forward end of the body portion.

Illustratively, the rear handle extends at an angle between 75° and 90° to the rearward end of the body portion.

Further, illustratively, the forward handle is attached to, and extends at an angle between 75° and 90° to, an intermediate region of the body portion. A hand guard is positioned between the forward handle and the forward end of the body portion and extends generally in the second direction. The forward handle includes means providing a housing and an opening into the housing. The apparatus further comprises a punch removably retained in the housing. The housing includes means providing an opening in the sidewall thereof. A bolt is provided for threaded engagement with the forward handle. The bolt projects through the opening in the sidewall to engage the punch and retain it in the housing. Manipulation of the bolt frees the punch for removal from the forward handle.

Additionally according to an illustrative embodiment of the invention, the forward end of the body portion comprises a socket having a pair of opposed walls. One of the socket walls is adjustable relatively toward and away from the other socket wall. The blade includes a tongue for insertion into the socket. Adjustment of the one socket wall toward the other socket wall captures the tongue between the walls and adjustment of the one socket wall away from the other socket wall releases the blade for removal from the socket. Illustratively, a bolt engages the socket wall and projects through an opening in the socket wall. The one wall comprises a wall of a block. The block includes means defining a recess for engagement by the end of the bolt which projects through the socket wall to capture the block movably in the socket.

The invention may best be understood by referring to the following description and accompanying drawings which illustrate the invention. In the drawings.

Figure 1:
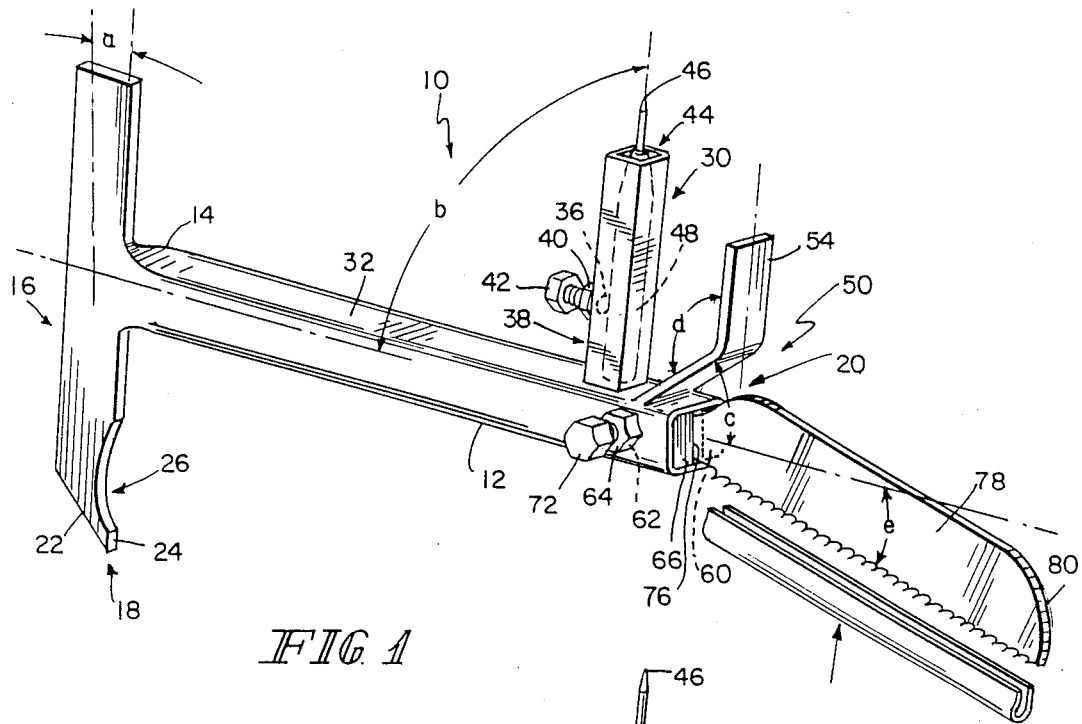
FIG. 1 illustrates a perspective view of a tool constructed according to the invention.

Referring to FIG. 1, a windshield saw 10 includes a square cross section, illustratively 1 inch by 1 inch (2.54 cm by 2.54 cm), tubular body portion 12 Illustratively, body portion 12 is about 9½ inches (24 cm) long. The rear end of body portion 12 is flattened as illustrated at 14. A rear handle 16 of flat stock is welded to the rear end 14 of body portion 12. The rear handle 16 is not perpendicular to body portion 12, but rather makes an angle a of about 80°–85° with body portion 12. Rear handle 16 illustratively is about eight inches (20 cm) long. Handle 16 projects above body portion 12 about 2¾ inches (7 cm). The lower end 18 of handle 16 is shaped to permit body portion 12 to be grasped near the front end 20 thereof and the windshield can be struck with the lower end 18 of handle 16 to provide a purchase point at which sawing through the windshield can be initiated. The lower end 18 of rear handle 16 includes a rearward surface 22 inclined at an angle of about 40°–45° to the longitudinal extent thereof and a forward surface 24 including a curved region 26 just above the lower end 18. Curved region 26 has a radius of curvature of illustratively 3 inches (7.6 cm).

A forward handle 30 is welded to, and extends upward from, the top surface 32 of body portion 12. Handle 30 illustratively is constructed from ¾ inch (1.9 cm) square eleven gauge stock. Handle 30 extends upward and forward at an angle b of about 95°–100° from surface 32, and illustratively is about 4¼ inches (10.8 cm) long. A hole 36 extends through the rear wall 38 of handle 30 about 1½ inches (3.8 cm) above surface 32. A ¼ inch (0.6 cm) nut 40 is welded to wall 38 over hole 36. A ¼ inch (0.6 cm) bolt 42 is threaded into nut 40 and holds a spring loaded center punch 44 releasably in the interior of handle 30. Center punch 44 is used by the rescuer to break out the tempered glass side and rear windows of a vehicle. The point 46 of punch 44 is placed in, for example, a lower corner of the window and the handle 48 of the punch 44 is pushed. This triggers the point 46 which releases and shatters the tempered glass of the side or rear window. The bolt 42 permits the punch 44 to be removed from handle 30 so that it can be operated more conveniently or be operated by one rescuer while another uses the saw 10 to remove the windshield.

A 1¼ inch (3.2 cm) wide by ¼ (0.6 cm) thick guard 50 extends upward from surface 32 adjacent the front end 20 of body 12. Guard 50 extends forward at a 40°-45° angle c to surface 32. At about 1½ inches (3.8 cm) from its lower end, guard 50 angles rearwardly at about a 135° angle d so that the upper portion 54 of guard 50 illustratively makes an 50°-85° angle with surface 32.

Figure 2:
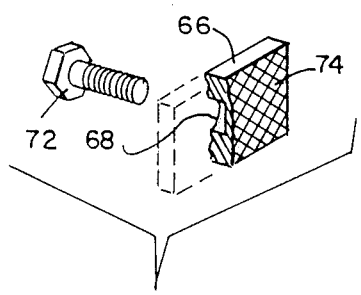
FIG. 2 illustrates a fragmentary perspective view of a detail of the embodiment of the invention illustrated in FIG. 1; and, FIG. 3 illustrates an alternative detail to a detail illustrated in FIG. 1.

A block 60 is welded to one of the vertical walls of body 12 inside the front end 20 of body 12. A hole 62 is provided through the opposite vertical wall of body 12. A 5/16 inch (0.8 cm) nut 64 is welded over hole 62. A block 66 has a relief 68 (FIG. 2) provided in one side 70 thereof. Relief 68 is large enough to receive the end of a 5/16 inch (0.8 cm) bolt 72. Block 66 is inserted into front end 20 adjacent block 60 and captured there on the end of bolt 72 when bolt 72 is threaded into nut 64. The adjacent, facing surfaces 74 of blocks 60, 66 are knurled or otherwise treated to roughen them so that they grip more securely the somewhat squared end 76 of a blade 78 of saw 10. End 76 is inserted between the knurled surfaces 74 of blocks 60, 66 and bolt 72 is tightened to capture blade 78 between surfaces 74 at the forward end 20 of body 12.

Blade 78 illustratively is half of a Lennox variable pitch (4 teeth per inch alternating with 6 teeth per inch) hacksaw blade from which the white finish has been blasted with glass beads and which then has been coated with dry graphite or polytetrafluoroethylene to provide a low-friction surface. The forward end 80 of blade 78 is profiled to about the same shape as region 26 of rear handle 16. Blade 78 is angled downwardly below the longitudinal extent of body 12 at an angle e of about 20°.

Figure 3:
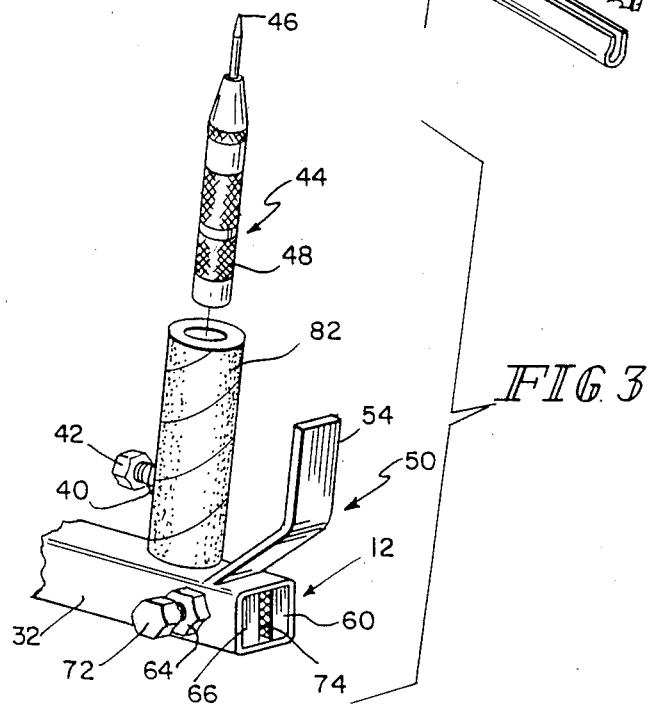

In an alternative embodiment of the forward handle illustrated in FIG. 3, the forward handle is covered by a cut off golf club grip 82. A vertical slot (not shown) is provided in the lower portion of grip 82 to accommodate nut 40. In the illustrated embodiment, the top is removed from grip 82 so that punch 44 can be removed from, and replaced in, the forward handle without the user having to remove grip 82 from the forward handle.

What is claimed is:

1. A glass saw comprising an elongated body portion having a forward end and a rearward end, a rear handle attached to the rearward end and extending generally transversely in at least a first direction from the body portion, a forward handle extending generally transversely from the body portion intermediate the forward and rearward ends thereof, and a blade having an end portion situated inside the forward end of the body portion, and means for removably attaching the end portion of the blade to the forward end of the body portion.

2. The apparatus of claim 1 wherein the rear handle extends generally transversely in first and second generally opposite directions from the body potion.

3. The apparatus of claim 2 wherein the rear handle extends at an angle between 75° and 90° to the rearward end of the body portion.

4. The apparatus of claim 1 wherein the rear handle extends at an angle between 75° and 90° to the rearward end of the body portion.

5. The apparatus of claim 1 wherein the forward handle extends generally in a second direction generally opposite to the first direction.

6. The apparatus of claim 5 wherein the forward handle is attached to, and extends at an angle between 75° and 90° to, an intermediate region of the body portion.

7. The apparatus of claim 5 and further comprising a hand guard positioned between the forward handle and the forward end of the body portion, the hand guard extending generally in the second direction.

8. The apparatus of claim 1 wherein the forward handle includes means providing a housing and an opening into the housing, and further comprising a punch removably retained in the housing.

9. The apparatus of claim 8 wherein the forward handle comprises a tube, the housing comprising the hollow interior of the tube, the opening comprising an open end of the tube.

10. The apparatus of claim 9 wherein the tube includes means providing an opening in the sidewall thereof, a bolt for threaded engagement with the forward handle, the bolt projecting through the opening in the sidewall to engage the punch and retain it in the hollow tube, manipulation of the bolt freeing the punch for removal from the forward handle.

11. The apparatus of claim 8 wherein the punch comprises a spring loaded center punch having a point configured to break glass.

12. The apparatus of claim 1 wherein the forward end of the body portion comprises a socket having first and second opposed walls, the first wall being adjustable toward and away from the second wall, and the end portion of the blade comprises a tongue for insertion into the socket, adjustment of said first wall toward said second wall capturing the tongue between the walls and adjustment of said first wall away from said second wall releasing the tongue of the blase for removal from the socket.

13. The apparatus of claim 1 wherein the forward end of the body portion comprises a socket, the socket comprising a wall, the socket wall including an opening, a bolt for engagement with the socket wall and projection through the opening in the socket wall, a block including means defining a recess for engagement by the end of the bolt which projects through the socket wall to capture the block movably in the socket, and the end portion of the blade includes a tongue for insertion into the socket, adjustment of the bolt in a first direction moving the block in one direction capturing the tongue in the socket and adjustment of the bolt in a second direction moving the block in another and opposite direction releasing the blade for removal from the socket.

* * * * *